Dec. 28, 1954     C. E. RAINSBURY     2,698,000
SIGNAL FOR PRESSURE REDUCING REGULATORS
Filed Aug. 13, 1952
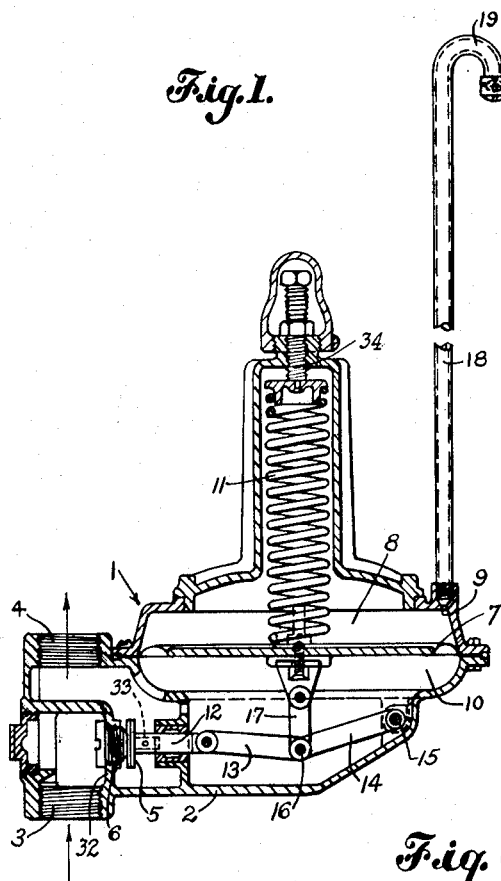
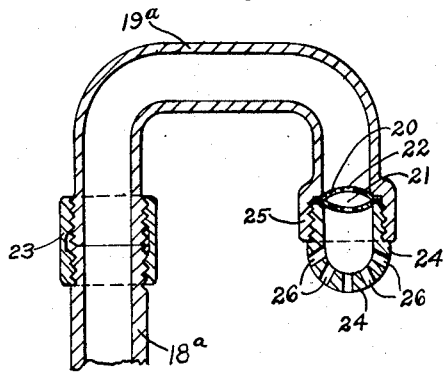
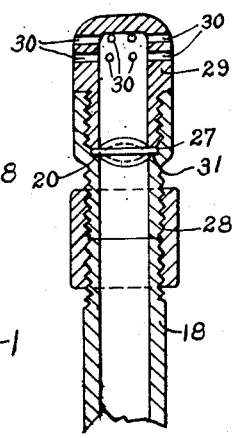
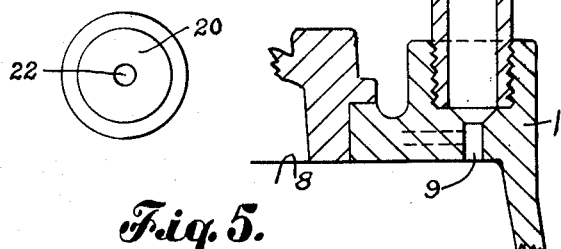
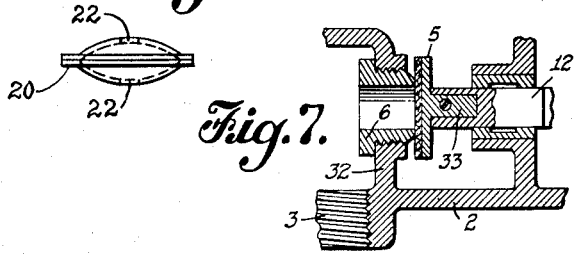
INVENTOR.
Charles E. Rainsbury.
BY Louis C. Smith
attorney United States Patent Office 2,698,000
Patented Dec. 28, 1954

2,698,000

SIGNAL FOR PRESSURE REDUCING REGULATORS

Charles E. Rainsbury, Brookline, Mass.

Application August 13, 1952, Serial No. 304,167

3 Claims. (Cl. 116—112)

This invention relates to pressure reducing regulators, and especially to a signal device designed to give a signal when the pressure reducing regulator is not functioning properly.

Pressure reducing regulators are commonly used in cases where a gaseous medium, such as gas for illuminating or heating purposes, steam, air, etc. is being conveyed through pipes under high pressure to a distributing system in which it is used at a low or reduced pressure, the purpose of the pressure reducing regulator being to maintain the required low or reduced pressure in the distributing system.

Such pressure reducing regulators usually include a casing having an inlet connected to the pipe carrying the high pressure gaseous medium, an outlet connected to the distributing system carrying the gaseous medium at a reduced pressure, a valve controlling the delivery of the high pressure gaseous medium from the inlet to the outlet of the casing and thus to the distributing system, and means responsive to variations in the pressure of the gaseous medium in the distributing system to operate the valve so as to maintain a substantially uniform pressure in said system. For convenience I will refer to the gaseous medium in the distributing system as the controlled medium inasmuch as the pressure thereof is controlled by the pressure reducing regulator.

In one well known type of pressure reducing regulator the valve is controlled by the movement of a diaphragm which divides the casing into an upper chamber having communication with the atmosphere through a breather orifice, and a lower chamber which is in communication with the casing outlet and thus with the distributing system, and which is filled with gaseous medium having the same pressure as the controlled medium in the system. In this type of pressure reducing regulator the diaphragm has a slight up and down movement as the pressure of the controlled medium in the distributing system varies, and connections are provided between the diaphragm and the valve so that any movement of the diaphragm is communicated to the valve.

In the operation of this type of pressure reducing regulator the diaphragm will have a slight breathing motion as the controlled pressure in the distributing system varies, and this will result in a gentle breathing motion of the air in the upper chamber back and forth through the breather orifice.

It is an object of the present invention to provide a signal device which is so associated with the breather orifice of the regulator casing and is so constructed that it does not interfere in any way with, and is unaffected by, the normal gentle breathing action of the diaphragm during normal operation of the pressure reducing regulator, but will become operative to give an alarm by abnormal or increased intensity and volume of gaseous medium moving through the breather orifice as a result of improper or faulty operation of the regulator such as would be caused by the blowing of the mercury seal of such regulator or the rupture of its diaphragm.

In the accompanying drawings:

Fig. 1 is a sectional view through a pressure reducing regulator of the type above referred to, which is shown as equipped with my improved signal device.

Fig. 2 is a fragmentary sectional view showing one manner of installing the signal device on the pressure regulator.

Fig. 3 is a sectional view illustrating a different manner of installing the signal device.

Fig. 4 is a top plan view of a whistle type signal which is adapted for use in carrying out my invention.

Fig. 5 is a side view of Fig. 4.

Fig. 6 is an enlarged fragmentary sectional view showing the breather orifice.

Fig. 7 is a fragmentary sectional view of the valve controlling the flow of gas from the inlet to the outlet.

The pressure reducing regulator with which my improved signal device is used is indicated generally at 1. It is shown as of that known type comprising a casing 2 having an inlet opening 3 which communicates with the pipe carrying the gaseous medium under high pressure, and also having an outlet 4 leading to the distributing system which contains the gaseous medium at a controlled reduced pressure. The communication between the inlet 3 and outlet 4 is controlled by a suitable valve. The valve herein shown comprises a valve seat member 6 which is mounted in a partition 32 that separates the inlet port 3 from the interior of the casing 2, and a valve member 5 which is adapted to seat against the seat member 6 thereby to close the communication between the inlet 3 and the outlet 4. The valve member 5 is mounted on a stem 12 which is movable as will be presently described to open and close the valve. Said valve member is shown as having a stem 33 which occupies a recess formed in the end of the stem 12 and is secured in place in any suitable way.

In this known type of regulator the casing 2 is divided by a flexible diaphragm 7 into an upper chamber 8 which is open to the atmosphere through a breather orifice 9, and a lower chamber 10 which has communication with the outlet 4 and which is normally filled with gaseous medium at the controlled reduced pressure.

The diaphragm 7 is shown as being of the spring-loaded type, there being a spring 11 which bears against the upper face of the diaphragm and the tension of which may be adjusted by an adjusting screw 34 in order to provide for different predetermined reduced pressures in the distributing system.

In the construction shown, the valve 5 is so connected to the diaphragm 7 that an upward movement thereof due to an increase of pressure therebeneath will give a closing movement to said valve, while a downward movement of the diaphragm will give an opening movement to the valve. One well known way of accomplishing this is to connect the stem 12 of the valve to one member 13 of a toggle device, the other member 14 of which toggle device is pivotally connected to the casing as shown at 15, and to connect the central joint 16 of the toggle device to the diaphragm by means of a link connection 17.

With this construction, upward movement of the diaphragm which will tend to straighten the toggle device 13, 14, will give the valve a closing movement, and downward movement of the diaphragm will operate through the toggle device to give the valve an opening movement.

Other known means for translating the up and down movement of the diaphragm 7 into an opening and closing movement of the valve 5 may be employed without departing from the invention.

During normal operation of the pressure reducing regulator the diaphragm will assume a position in which the pressure on the upper side of the diaphragm is balanced by the pressure of the controlled gaseous medium in the distributing system. If the gaseous medium is being used from the distributing system faster than it is being delivered through the valve, the pressure beneath the diaphragm will decrease, and the resultant downward movement thereof will open the valve wider, thus allowing an increased amount of high pressure gaseous medium to be delivered therethrough. As the pressure beneath the diaphragm increases due to the increased delivery of high pressure gaseous medium through the inlet opening 3, the diaphragm will move upwardly until the pressure of the gaseous medium against the diaphragm is balanced by the pressure of the spring and the atmosphere on the upper side of the diaphragm.

During the normal operation of the pressure reducing regulator there will thus be a gentle breathing motion of the diaphragm 7 which will cause a gentle breathing motion of the air through the breather orifice 9.

In many installations the pressure regulator is equipped with a breather tube 18 which communicates with the breather orifice 9, said breather tube frequently being carried upwardly to a point some distance above the location of the pressure reducing regulator and frequently having a return bend 19 on its upper end, so that the outer end of said breather tube opens downwardly.

As stated above, my invention has for its purpose to provide a signal, which is so mounted with relation to the breather orifice and is so constructed that it will be inoperative to give a signal so long as the normal breathing operation through the breather orifice is taking place, but which becomes operative to give a signal, whenever there is an increased movement of air or gaseous medium through said breather orifice such as would occur if the mercury seal (not shown) of the regulator should blow out or the diaphragm should become ruptured, it being understood that when the mercury seal does blow the gaseous medium released from the lower chamber of the casing is delivered to the breather orifice.

While any suitable signal device capable of operating in this way may be used, I have chosen to illustrate herein a signal 20 of the whistle type which is not rendered operative by the normal breathing action through the breather orifice but which will become operative to emit an audible signal by abnormal movement of air or gaseous medium through said orifice.

Said signal is formed with a central chamber 21 and openings 22 through the opposite sides of the device, thereby providing a whistle with a through opening.

In accordance with my invention, this whistle type signal is installed on the pressure reducing regulator with its through opening in series communication with the breather orifice so that the breathing movement of the air through the breather orifice 9 causes a similar breathing movement of air through the whistle signal.

Said whistle type signal 20 may be mounted directly on the regulator casing with its openings 22 in direct communication with the breather orifice 9, or if the regulator is provided with a breather pipe 18 in communication with said breather orifice, the signal may be mounted in said pipe, so that the opening through the signal is in series communication with the breather orifice and provides the sole egress opening for the pipe 18.

In Fig. 1 this whistle type signal is shown as installed on the down-turned end 19 of the breather tube 18.

As stated above the whistle type signal is so constructed that the breathing movement of the air therethrough resulting from the breathing operation of the diaphragm 7 during normal operation of the pressure regulator will produce no sound. If, however, the valve 5 should operate improperly, as might be the case if dirt or foreign matter accumulated on the face thereof to prevent it from closing properly, and if consequently the pressure beneath the diaphragm should build up sufficiently beyond the predetermined pressure for which the pressure regulator was set, to cause the mercury seal (not shown) with which the regulators are provided to blow, the resultant increased intensity and volume of gaseous medium passing through the breather orifice and the signal device will render the latter operative to produce an audible signal, thus giving notice that the regulator is not functioning properly and needs attention.

Another defect which may develop in a pressure regulator of this type is that caused by a rupture of the diaphragm 7. If this occurs, then the high pressure gaseous medium from the inlet 3 will escape through the breather opening 9 and the breather pipe, thus not only causing a loss of gaseous medium but also developing a hazardous condition if such gaseous medium is combustible or has toxic characteristics. With my improvements the signal device would give an alarm in case of the rupturing of the diaphragm 7 so that steps could be taken immediately to shut off the gaseous medium and repair the damage.

In Fig. 1 the breather pipe 18 has a return bend at its upper end to which the signal device is secured. In Fig. 2 the breather pipe has the main section 18a and a U section 19a which is connected at one end to the main section by means of coupling 23. In this embodiment the whistle type signal 20 is mounted in the down-turned end of the member 19a and is clamped in position by a thimble-shaped clamping member 24 which is screw-threaded into the enlarged end 25 of the U-shaped member 19a. The member 24 is shown as having a plurality of openings 26 to allow for the breathing movement of the diaphragm and for the escape of gaseous medium which may be discharged through the breather pipe in case the diaphragm becomes ruptured or the mercury seal blows.

In Fig. 3 there is shown still a different manner of mounting the signal device 20, wherein said signal device is supported on an interior shoulder 31 of a pipe section 27 which is connected to the breather pipe 18 by a coupling 28, said signal device being clamped to said shoulder by a thimble-shaped cap piece 29, which is provided in its side wall with vent or escape openings 30.

It will be noted that in all forms of the invention the whistle element is so mounted that the opening 22 therethrough constitutes the sole egress opening from the breather orifice so that all of the air or gaseous medium which is forced through said orifice is compelled to pass through the whistle element. Said element, however, is so constructed that it does not interfere in any way with the normal breathing operation through the breather orifice which occurs when the regulator is functioning properly, and will not become operative to give a warning signal by such normal breathing operation. It is, however, responsive to abnormal flow of air or gaseous medium through said breather orifice to sound an alarm.

Although I have shown herein a signal of the whistle type, yet I wish to state that the invention is not limited to the use of a signal device of this particular type, as any other signal device which will not interfere with the normal breathing operation through the breather orifice, and will not be rendered operative by such normal breathing operation, but will become operative to give a warning signal in response to abnormal flow of air or gaseous medium through the breather orifice, may be used without departing from the invention.

I claim:

1. The combination with a pressure reducing regulator of the type having a casing provided with an inlet for gaseous medium under high pressure and an outlet through which said medium under controlled reduced pressure is delivered to a distributing system, a pressure regulating valve controlling the flow of gas from the inlet to the outlet and thus controlling the reduced pressure at the outlet, a valve-controlling diaphragm operatively connected to the valve and dividing the casing into two chambers, one of which is permanently open to the atmosphere through a breather orifice and the other of which has commuication with the outlet and thus contains gaseous medium at the reduced controlled pressure, whereby the movement of the diaphragm due to slight variations of the controlled pressure of the gaseous medium will operate the valve and thus control the flow of gas from the inlet to the outlet and also produces a normal breathing action through the breather orifice, of a signal element having an opening therethrough, means mounting said signal element with its through opening in series communication with the breather orifice so that the breathing movement of air or gaseous medium through the orifice causes a corresponding breathing movement of air or gaseous medium through said signal element, said element being unresponsive to movement of air or gaseous medium therethrough caused by the normal breathing operation through the breather orifice but being responsive to give a warning signal by abnormal movement therethrough of air or gaseous medium caused by abnormal movement of such gaseous medium through the breather orifice, as a result of faulty operation of the regulator.

2. The combination with a pressure reducing regulator of the type having a casing provided with an inlet for gaseous medium under high pressure and an outlet through which said medium under reduced pressure is delivered to a distributing system, a valve controlling the flow of gaseous medium from the inlet to the outlet and thus controlling the reduced pressure, a valve-controlling diaphragm operatively connected to the valve and dividing the casing into two chambers, one of which is permanently open to the atmosphere through a breather orifice and the other of which has communication with the outlet and thus contains gaseous medium at the reduced controlled pressure, whereby the movement of the diaphragm due to variations of the controlled pressure of the gaseous medium will operate the valve and thus control the flow of gas from the inlet to the outlet and also cause a breathing movement of air through the breather orifice, of an audible signal element of the whistle type having an opening therethrough, means mounting said signal element with its opening in series communication with the breather orifice whereby breathing movement of air through the breather orifice due to the normal breathing movement of the diaphragm causes a corresponding breathing movement of air through the signal element, the latter being inoperative to produce an audible signal by the normal breathing movement of air therethrough but becoming operative to produce such audible signal when the movement of air or gaseous medium therethrough is of greater intensity and larger volume than that produced by the normal breathing movement of the diaphragm.

3. A pressure regulator as defined in claim 2 and which includes a breather pipe connected to the breather orifice, and a signal of the whistle type having an opening therethrough mounted on the end of the breather pipe with the opening through the signal member in series communication with and forming the sole egress from the pipe.

References Cited in the file of this patent
UNITED STATES PATENTS

| Number | Name | Date |
| --- | --- | --- |
| 1,312,097 | Buckner | Aug. 5, 1919 |
| 1,855,682 | MacLean | Apr. 26, 1932 |
| 2,054,850 | Deming | Sept. 22, 1936 |